June 7, 1960   H. F. BERGMAN, JR   2,939,584
DISPLAY STANDS
Filed June 2, 1958

INVENTOR
HERBERT F. BERGMAN, JR.
BY Richard E. Brink
ATTORNEY

2,939,584
Patented June 7, 1960

2,939,584
DISPLAY STANDS

Herbert F. Bergman, Jr., St. Paul, Minn., assignor of one-third to Royal C. Orren and Kenneth P. Griswold, St. Paul, and one-third to Richard E. Brink, White Bear Lake, Minn., a copartnership Filed June 2, 1958, Ser. No. 739,207

7 Claims. (Cl. 211—27)

This invention relates to support and display stands. It particularly relates to stands which are adapted to support a seat for infants.

It is an object of this invention to provide a portable display stand for a wide variety of objects. It is also an object of this invention to provide an extremely stable but readily collapsible display stand. It is a more specific object of this invention to provide a supporting frame upon which a seat for infants may be placed or from which it may be suspended. Other objects of the invention will be apparent from the subsequent description thereof.

Figure 1:
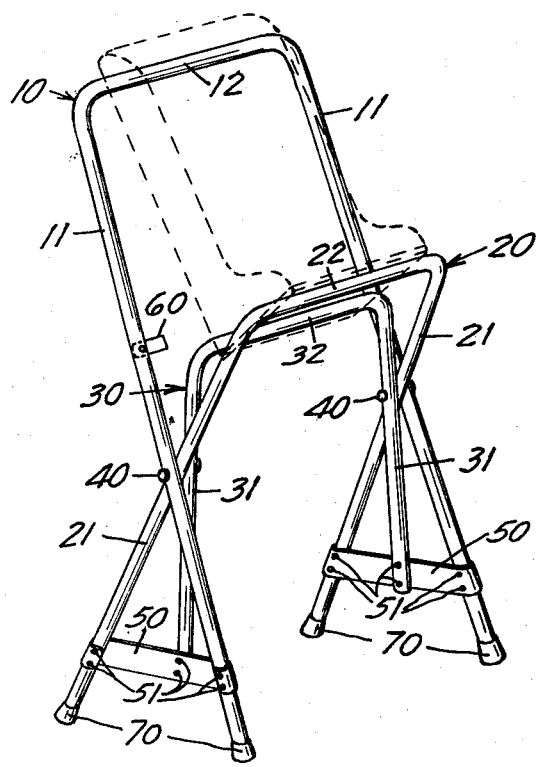
Figure 2:
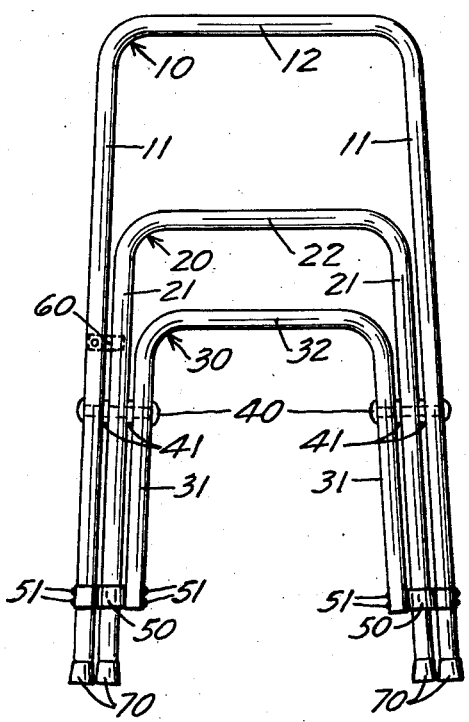

A preferred embodiment of my invention is illustrated in the accompanying drawings, in which Figure 1 is a perspective sketch of my novel support and display stand, the dashed lines illustrating a seat for infants supported by the stand, and Figure 2 is a front view of the stand shown in Figure 1.

Referring to the drawings in more detail, it will be noted that the display stand comprises frame members 10, 20, and 30, each of said frame members having two legs and a crossbar. Legs 11 of frame member 10 are connected to legs 21 of frame member 20 and legs 31 of frame member 30 by bolts or pintles 40. Washers 41 are mounted on pintles 40 and serve to separate legs 21 from legs 11 and legs 31. Straps 50, which are attached to the lower portions of legs 11, 21, and 31 by rivets 51, limit the angle at which legs 11 and 21 intersect, and also provide a simple means of maintaining frame member 20 in a firm and upright position. I generally prefer to make straps 50 from flexible material such as plastic webbing, leather, fine chain, braided wire, or the like so as to permit the display stand to be folded into a flat compact form for storage or transporting. The display stand can be collapsed by rotating frame members 10, 20, and 30 on pintles 40 until said frame members are parallel, straps 50 folding to permit the rotation to take place. Stop 60 is provided to make certain that the folded display stand will be opened in only one direction in order to avoid misalignment and distortion of straps 50. For a permanently erected stand I may fashion straps 50 from more rigid material.

In use, my novel support and display stand is erected as shown in Figure 1, rubber feet 70 preventing legs 11 and 21 from scratching the floor. An object to be supported or displayed may then be placed on the stand as indicated by the dashed lines, crossbars 12 and 22 preventing undesirable angular movement of the object, and crossbar 32 providing vertical support. It will be readily appreciated that this support by three crossbars provides an extremely stable means of holding a wide variety of objects at a predetermined position. The weight of the object supported tends to force frame members 10 and 20 to diverge at a greater angle, which in turn increases the tension on straps 50 and stabilizes frame member 30. If objects are to be displayed at various angles, I may modify at least one of the frame members to permit the crossbar to be adjustably attached to its corresponding legs so that its relative position may be changed as desired.

I have found my novel stand to be particularly useful as a support for infant seats. Such seats typically constitute a relatively long back member and a relatively short seat member at right angles thereto. Seats of this type are generally provided with a strap for holding an infant in place and a set of tie strings attached to the upper portion of the back member for holding the seat in position. A typical seat is described and claimed in U.S. Patent No. 2,324,421, issued to Dr. Alfred J. Ouellette; this seat is available commercially under the trade name "Infanseat."

When my stand is used to support a seat for infants in the manner shown in Figure 1, the back portion of the seat rests against crossbars 11 and 31, and the bottom of the seat rests against crossbar 21. Preferably the aforementioned tie strings of the infant seat are attached to crossbar 11 to hold the seat firmly in place. Although the dimensions of my novel display stand may be varied considerably without departing from the spirit of the invention, I have found that certain dimensions are especially desirable when the stand is used to support an infant seat. If crossbars 10, 20, and 30 are respectively about 35 inches, 28 inches, and 25 inches above the floor, and if frame members 10 and 20 are arranged to intersect at an angle of about 60° and at a height about 18 inches above the floor, an infant seat supported as shown in Figure 1 will be at a position which is comfortable for the infant and convenient for his mother.

My novel display stand may also be used as a sturdy support from which to suspend an infant seat so as to provide a portable glider-swing device. This modification is conveniently accomplished by supending the upper portion of the infant seat back member from crossbar 12, using, e.g., the aforementioned tie strings to accomplish this function. The forepart of the seat may then be suspended from crossbar 20 by means of a compsession spring-chain arrangement similar to that frequently found on storm doors, one such assembly attaching to each side of the seat portion. If desired, supporting eye-bolts may be attached to the outer portions of crossbar 22 to facilitate this arrangement. Toys may then be attached to either crossbar 22 or crossbar 32 for the enjoyment of an infant supported by the glider-swing arrangement. A gentle swinging, bouncing, or gliding action may be imparted to the thus suspended seat by either the infant himself or someone wishing to amuse him.

My novel display stand may also be employed to support a desk top, blackboard, easel, or the like by providing a suitable flat table-like member which can be clamped to crossbar 22 and suspended at any desired height below crossbar 12 by means of adjustable J-hooks.

A wide variety of materials may be employed to make my novel display stand, some variations having been discussed hereinabove. I generally prefer to make frame members 10, 20 and 30 from tubular aluminum because of its lightness and strength, which contribute greatly to the utility and portability of my display stand. I have found that tubing having an inner diameter of 5/8 inch and an outer diameter of 3/4 inch is very satisfactory.

Having described my invention, I do not intend to be restricted in any way other than by the scope of the appended claims.

What I claim is:

1. A display stand comprising a first frame member, a second frame member, and a third frame member; each of said frame members comprising a pair of legs, each of said legs having an upper portion, a lower portion, and an intermediate connection point, the upper portions of each pair of legs being rigidly connected by a load-supportable crossbar, a bolt joining each of the connection points of said first frame member to the corresponding connection points of said second and third frame members, and a strap extending between and connecting the lower portions of the legs of said first and second frame members, said strap being intermediately attached to said lower portion of the legs of said third frame member.

2. A collapsible display stand comprising a first frame member, a second frame member, and a third frame member; each of said frame members comprising a pair of legs, each of said legs having an upper portion, a lower portion, and an intermediate pivot point, the upper portions of each pair of legs being rigidly connected by a load-supportable crossbar; a pintle connecting each of the pivot points of said first frame member to the corresponding pivot points of said second and third frame members; and a flexible strap extending between and connecting the lower portions of the legs of said first and second frame members thereby limiting the angle of intersection between the legs of said first frame member and the legs of said second frame member, said strap being intermediately attached to said lower portion of the legs of said third frame member.

3. A collapsible display stand comprising a first frame member, a second frame member, and a third frame member; each of said frame members comprising a pair of legs, each of said legs having an upper portion, a lower portion, and an intermediate pivot point, the upper portions of each pair of legs being rigidly connected by a load-supportable crossbar; a pintle connecting each of the pivot points of said first frame member to the corresponding pivot points of said second and third frame members; the crossbar of each frame member differing in length from the crossbar of each other frame member, and the upper portion of the legs of each frame member differing in length from the upper portion of the legs of each other frame member, thereby to permit said frame members to rotate about said pintle and nest within each other; the lower portions of the legs of said first and second frame members being of a length equal to each other and longer than the lower portion of the legs of said third frame member; and a flexible strap extending between and connecting the lower portions of the legs of said first and second frame members thereby limiting the angle of intersection between the legs of said first frame member and the legs of said second frame member, said strap being intermediately attached to said lower portion of the legs of said third frame member.

4. The display stand of claim 3 further characterized by the fact that the upper portion of the legs of said third frame member is shorter and narrower than the upper portion of the legs of said second frame member, and the upper portion of the legs of said second frame member is shorter and narrower than the upper portion of the legs of said first frame member.

5. The display stand of claim 4 further characterized by the fact that each of said frame members comprises a single U-shaped piece of tubular metal.

6. The display stand of claim 5 further characterized by the fact that when said rack is erected the legs of said third frame member are vertical and the legs of said first and second frame members are disposed at equal but opposite angles to the legs of said third frame member.

7. The display stand of claim 6 further characterized in that (1) the legs of said first and second frame members intersect at an angle of about 60° at a point about 18 inches above the floor and (2) the crossbars of said first, second, and third frame members are respectively about 35 inches, 28 inches, and 25 inches above the floor.

References Cited in the file of this patent
UNITED STATES PATENTS

| | | |
|---|---|---|
| 214,474 | Uren | Apr. 15, 1879 |
| 688,468 | Ihde | Dec. 10, 1901 |
| 2,106,309 | Sweeney | Jan. 25, 1938 |
| 2,676,709 | Walsh | Apr. 27, 1954 |